US009584745B2

(12) United States Patent
Ladd (10) Patent No.: US 9,584,745 B2
(45) Date of Patent: Feb. 28, 2017

(54) IMAGE SENSORS WITH N-ROW PARALLEL READOUT CAPABILITY (71) Applicant: SEMICONDUCTOR COMPONENTS INDUSTRIES, LLC, Phoenix, AZ (US)

(72) Inventor: John Ladd, Santa Clara, CA (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 170 days.

(21) Appl. No.: 14/537,805

(22) Filed: Nov. 10, 2014

(65) Prior Publication Data

US 2015/0130977 A1   May 14, 2015

Related U.S. Application Data (60) Provisional application No. 61/902,516, filed on Nov. 11, 2013.

(51) Int. Cl.
H04N 5/3745 (2011.01)
H04N 5/378 (2011.01)
H04N 5/347 (2011.01)
H04N 5/353 (2011.01)

(52) U.S. Cl.
CPC .......... H04N 5/3745 (2013.01); H04N 5/347 (2013.01); H04N 5/3532 (2013.01); H04N 5/378 (2013.01)

(58) Field of Classification Search
CPC ............ H04N 5/23241; H04N 5/2355; H04N 5/3575; H04N 5/363; H04N 5/3745; H04N 5/37457; H04N 5/378; H04N 5/347; H04N 5/3532; H04N 5/37455; H01L 27/14643–27/14663
USPC ...... 348/294, 302, 308; 250/208.1; 257/291, 257/292
See application file for complete search history.

(56) References Cited

U.S. PATENT DOCUMENTS

| 7,375,752 | B2* | 5/2008 | Raynor | H04N 5/353 348/241 |
| 8,890,047 | B2 | 11/2014 | Solhusvik et al. | |
| 9,191,582 | B1* | 11/2015 | Wright | H04N 5/33 |
| 2004/0246354 | A1* | 12/2004 | Yang | H04N 3/1562 348/308 |

(Continued)

Primary Examiner — Lin Ye
Assistant Examiner — Chriss Yoder, III
(74) Attorney, Agent, or Firm — Treyz Law Group, P.C.; Vineet Dixit; Joseph F. Guihan (57) ABSTRACT An image sensor configured to readout an arbitrary number of rows in parallel is described, comprising a rolling global shutter pixel array which can be operated as a true global shutter. Shielding structures may be formed in the pixel array to minimize signal coupling between adjacent pixels when multiple rows are simultaneously reset and read out. A plurality of column select lines may be formed in a given pixel pitch, and the image sensor may utilize read out components and circuitry associated with conventional readout circuits to be used in simultaneously reading out a two-dimensional region of the image sensor. The image sensor may be configured to use charge binning between rows that are reset and read out in parallel to improve power consumption. The image sensor may include redundant output stages with routing circuitry that improves image sensor yield by compensating for yield loss in the output stage.

20 Claims, 5 Drawing Sheets (56) References Cited

U.S. PATENT DOCUMENTS

2009/0108176 A1    4/2009   Blanquart
2012/0273854 A1   11/2012   Velichko et al.
2014/0226047 A1    8/2014   Lahav et al.

* cited by examiner

IMAGE SENSORS WITH N-ROW PARALLEL READOUT CAPABILITY

This application claims the benefit of provisional patent application No. 61/902,516, filed Nov. 11, 2013, which is hereby incorporated by reference herein in its entirety.

BACKGROUND

This relates generally to imaging systems and, more particularly, to simultaneously operating two-dimensional arrays or blocks of image pixels on an image sensor.

Modern electronic devices such as cellular telephones, cameras, and computers often include camera modules having digital image sensors. An image sensor (sometimes referred to as an imager) is formed from a two-dimensional array of image sensing pixels. Each pixel receives incident photons (light) and converts the photons into electrical signals.

Capturing images using a CMOS image sensor typically involves using an electronic rolling shutter (ERS) algorithm to successively reset, integrate, and read out single rows of image pixels on the image sensor. In the traditional ERS algorithm, row reset and readout are typically performed for a single row at a given time. Row reset refers to an operation which prepares a pixel for light capture by resetting a charge storage node to a given voltage. Row readout refers to an operation on image pixels that have been exposed to light for a desired duration of time, that involves sampling the pixel columns of a given row and converting a value related to the amount of charge stored by the pixel during exposure to a digital signal.

Traditional image sensors that are operated using an ERS algorithm typically have pixel output stages for only a single row of pixels. The delay associated with processing signals for a single row through the pixel output stage often determines the maximum frame rate and resolution at which a given image sensor can be configured to operate.

Another parameter that often determines the maximum frame rate and resolution at which a given image sensor can operate is row integration period. This integration period specifies the duration during which charge associated with incident light is allowed to be accumulated in a given pixel before the charge is read out. When row readout speeds are constant, but higher frame rates are desired or required, an image sensor will be forced to reduce exposure or integration period of pixels in its rows, which can lead to poor image capture in low-light environments or a reduced resolution image.

Row read-out is traditionally performed in a pixel output stage which provides a processing data-path (such as sample-and-hold, amplification, analog-to-digital conversion, and image processing) for the pixels in each individual row, corresponding to the number of active columns. When image sensors are produced, manufacturing defects or yield loss resulting in even a single inoperable or dysfunctional processing data-path may further limit the operable resolution and frame rate.

Image sensors that are operated using an ERS algorithm have inherent bounds on the maximum frame rates that they can achieve while maintaining image resolution and robust imaging capabilities. Such image sensors are also susceptible to manufacturing defects that both increase the costs associated with producing a fully operational sensor and decrease the functionality of an image sensor.

It would therefore be desirable to provide improved image sensors and methods for operating image sensors.

DETAILED DESCRIPTION

Figure 1:
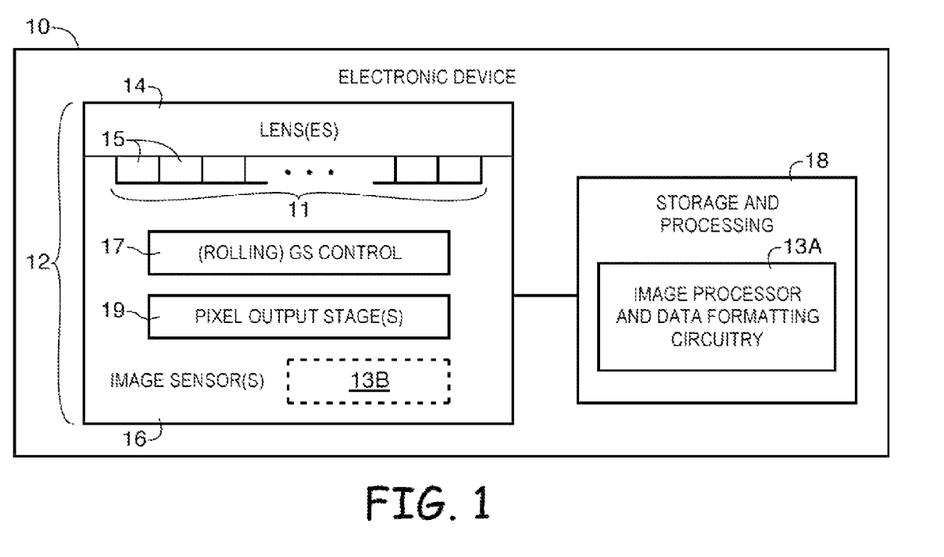
FIG. 1 is a schematic diagram of an illustrative imaging system with an image sensor having image sensor pixels that may be used in a parallelized reset and readout process in accordance with an embodiment of the present invention.

Embodiments of the present invention relate to image sensors configured to readout a plurality of imaging pixel rows simultaneously. Simultaneously readout data may also processed by output stages in the image sensor, and undergo image processing operations after being read out. An electronic device with a camera module is shown in FIG. 1. Electronic device 10 may be a digital camera, a computer, a cellular telephone, a medical device, or other electronic device. Camera module 12 (sometimes referred to as an imaging device) may include one or more image sensors 16 and one or more lenses 14. During operation, lenses 14 (sometimes referred to as optics 14 or optical elements 14) focus light onto image sensor 16. Image sensor 16 includes photosensitive elements (e.g., pixels) that convert the light into digital data. Image sensors may have any number of pixels 15 (e.g., hundreds, thousands, millions, or more). A typical image sensor may, for example, have millions of pixels (e.g., megapixels). As examples, image sensor 16 may include, bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc. Image sensor 16 may additionally include control circuitry for operating the array of image pixels 11.

A so-called electronic rolling shutter (ERS) is named as such because the pixel rows of array 11 are reset and read out successively, as the pixel rows or, more precisely, row control and readout control signals, are "rolled" through the array to create a corresponding image frame. An image sensor such as image sensor 16 may reset and read out N-rows of pixels in parallel, where N is at least one and no greater than the total number of rows in the array 11 of image pixels 15. When the value of N is greater than or equal to 1 and less than the total number of rows in the array 11, then image sensor 16 may sometimes be referred to as a rolling global shutter (sometimes referred to herein as a "rolling GS" or "RGS") sensor. When N is at least 1 but less than the total number of rows of array 11, each block of N rows that is reset and read out in parallel may share certain characteristics with images produced by a global shutter and thus may be assured or assumed to have a common reset time, a greater degree of color accuracy within the block, and reduced blurring or flickering artifacts.

However, when the entire array 11 is not read out at once, i.e. when N is less than the number of rows in the array 11, then the successive blocks of N rows that are read out in parallel, or rather the corresponding row control and readout control signals, can be described as "rolled" through to create an image frame. N is often an integer factor of the number of rows in the array 11; e.g. if the array 11 has 1000 rows, N may be 5 rows, 10 rows, 20 rows, 50 rows, 100 rows, 250 rows, etc. N may also be a number that is not a factor of the number of rows in the array 11.

When N is equal to the number of rows in the array 11, then the image sensor 16 may sometimes be referred to as a global shutter, or true global shutter. Generally, in connection with the present invention, the terms rolling global shutter and true global shutter refer to an image sensor parameterized by N, the number of that the image sensor is configured to both reset and rows read out in parallel. Generally, features described in connection with the true global shutter are also applicable to the rolling GS unless stated otherwise.

Image sensor 16 may include rolling global shutter control circuitry 17, sometimes referred to herein as "rolling GS control circuitry 17" configured to operate the array 11 of image pixels 15 as a global shutter by resetting and reading out a plurality of rows in parallel. Rolling GS control circuitry 17 may be programmable to select and vary the number of rows that will be read out in parallel during image capture operations. Rolling GS control circuitry 17 may alternatively be hard-coded or hard-wired to operate the array of image sensors by resetting and reading out a fixed number of rows in parallel. During image capture operations, rolling GS control circuitry may be configurable to adjust the operational settings and configuration parameters that determine factors such as timing, calibration, sampling, binning, and readout of the array 11 of image pixels 15 during operation of device 10.

Image sensor 16 may include an array of pixels formed with a color filter array. A typical color filter array is the Bayer color filter array, but the pixels 15 in array 11 of image sensor 16 may be configured to use any suitable color filter array with any suitable arrangement of red, green, blue, transparent, near infra-red, polarized light, cyan, yellow, magenta, or emerald filters. Such filters may be formed using any suitable material for passing light of a certain wavelength or band of light to a photosensitive element in the pixel. Plasmonic light guides or plasmonic light filters may also be used in connection with the present invention.

After image pixels have been exposed to light for an integration period (e.g., a period that may be determined at least partly by a user-imposed constraint on the output image, such as frame rate, resolution, or operating state), rolling GS control circuitry 17 may send image signals (e.g., pixel values corresponding to each pixel) from a plurality of rows in array 11 to pixel output stages 19. In the data path of a stored charge associated with light incident on a given image pixel, an output stage such as those contained in pixel output stages 19 may be used to sample and hold a pixel value or a binned value associated with the combination of multiple pixels. An output stage may then amplify the signal and convert the amplified analog signal to a digital signal using an analog-to-digital converter.

Rolling GS control circuitry 17, pixel output stages 19, and image processing and data formatting circuitry 13B are depicted in FIG. 1 as being parts of the image sensor, but do not necessarily have to be formed on the same plane as the array of pixels 11. For example, pixel output stages 19 may be formed on a layer below the plane of the image pixel array 11. Pixel output stages 19 formed on a layer below the plane of the image pixel array 11 may be positioned such that the routing required to transfer stored charge from the pixels 11 is minimized. As an example, pixel output stages 19 may be formed in a configuration such that an output stage is formed directly underneath every pixel on a different plane of either a shared or separate semiconductor substrate as the one which supports the pixel array 11. Pixel output stages 19 may include a number of individual output stages corresponding in number to the number of pixels that image sensor 16 is configured to read out in parallel. Pixel output stages 19 may, for example, be formed such that at least one dedicated output stage for each pixel in array 11 is provided. If desired, pixel output stages 19 may include redundant output stages that can be provided signals through routing connections corresponding to charges stored in pixels 15. In general, the number of redundant output stages provided may be any multiple of the minimum number of output stages in addition to those required to read out pixel values from a given plurality of rows in parallel. Pixel output stages 19 need not be formed exclusively on the plane of the array 11 of image pixels 15, or exclusively on a layer below the plane of the array 11. Pixel output stages 19 may be formed both on the plane and chip containing the array 11, and on a layer below the plane of the array 11.

Pixel output stages 19 may receive pixel values corresponding to charge stored on a single pixel, or a pixel value corresponding to charge stored on a plurality of pixels, as is the case when sensor 16 is configured to perform binning on the image pixels. Binning the pixels often involves combining neighboring pixels of a given color. In traditional ERS image sensors, binning is performed between pixels on different rows that were reset and read out during different periods of time. Binning, when performed on digital pixel values after the stored pixel charge has been converted to a digital value during readout, is subject to accumulated noise associated with the sum of the noise associated with each analog-to-digital conversion of the respective pixels used in the binned value. Because the image sensor 16 can be configured to reset a plurality of rows in parallel, binning can be performed on adjacent pixels associated with the same color channel before analog-to-digital conversion has occurred. Binning pixels before analog-to-digital conversion may result in an increased signal-to-noise ratio (SNR), as readout noise from the pixel output stage is introduced to a value with a much higher signal value on account of being the sum of neighboring channels of the same color. Binning of pixels read out simultaneously is also free from the limitations of color inaccuracies inherent in binning of pixels on different rows read out using ERS algorithms to control image sensors in certain operating conditions such as in dynamically lit environments, high speed motion capture, etc.

Still and video image data from image sensor 16 may be provided to image processing and data formatting circuitry 13. Image processing and data formatting circuitry 13 may be provided on the image sensor 16 itself as 13B, or it may be a part of storage and processing circuitry 18 as 13A. Image processing and data formatting circuitry 13 may be used to perform image processing functions such as demosaicing, edge seam correction, automatic focusing functions, depth sensing, data formatting, adjusting white balance and exposure, implementing video image stabilization, face detection, etc. For example, upon receiving image data produced by a parallelized readout of a plurality of rows, image processing and data formatting circuitry 13 may process data gathered by the pixels in the group of rows read out in parallel as if the pixels in the group were captured using a global shutter. Processing data as if the pixels were captured using a global shutter may involve modified or reduced correction, in comparison with corrections associated with ERS pixel data. Circuitry 13 may additionally demosaic the data from a group or block of pixel rows read out in parallel using only data contained in the set or block formed by the rows read out in parallel. Circuitry 13 may additionally perform edge or seam correction on the edges of and between blocks of image data that are read out using a parallelized readout method.

Image processing and data formatting circuitry 13 may also be used to compress raw camera image files if desired (e.g., to Joint Photographic Experts Group or JPEG format). In a typical arrangement, which is sometimes referred to as a system on chip (SOC) arrangement, image sensor 16 and image processing and data formatting circuitry 13 are implemented on a common integrated circuit as in 13B. The use of a single integrated circuit to implement image sensor 16 and image processing and data formatting circuitry 13B can help to reduce costs. This is, however, merely illustrative. If desired, camera sensor 14 and image processing and data formatting circuitry 13 may be implemented using separate integrated circuits as in 13A.

Camera module 12 may convey acquired image data to storage and processing circuitry 18. Electronic device 10 typically provides a user with numerous high-level functions. In a computer or advanced cellular telephone, for example, a user may be provided with the ability to run user applications. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

Figure 2:
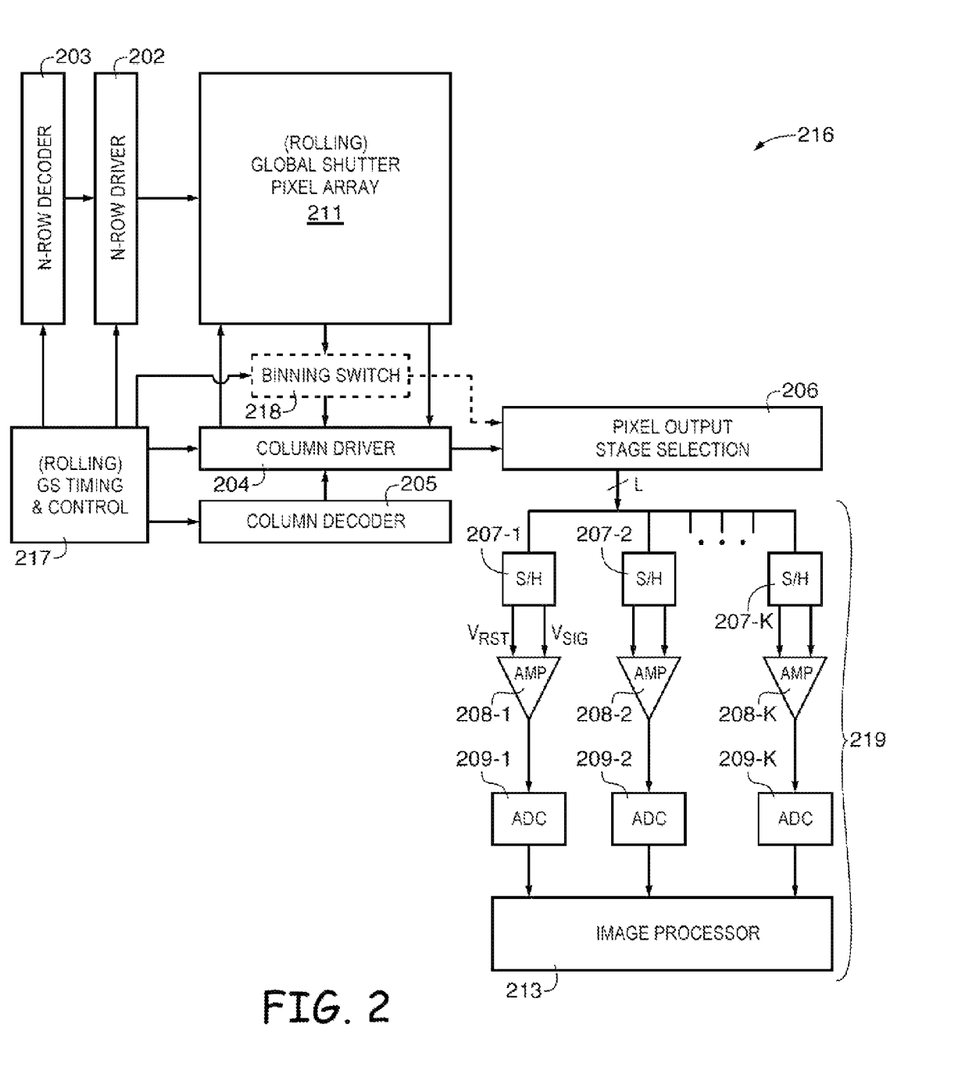
FIG. 2 is a block diagram of an image sensor having parallelized reset and readout, configurable binning, and output stage selection capabilities in accordance with an embodiment of the present invention.

FIG. 2 illustrates a simplified block diagram of imager 216 (e.g., a CMOS imager employing a carrier wafer having alignment marks aligned to components in a device wafer such as photosensors, where the alignment marks on the carrier wafer may be used in forming frontside components on the device wafer that are aligned to backside components on the device wafer as described herein). Rolling GS pixel array 211 includes a plurality of pixels containing respective photosensors arranged in a predetermined number of columns and rows. Rolling GS pixel array 211 may share some or all of the features of array 11 of pixels 15 in FIG. 1. Rolling GS pixel array 211 may have rows of vertical and/or horizontal blanking pixels, as well as optically black pixels. The region or portion of rolling GS pixel array 211 that contains light sensitive pixels and is used to form the image frame may be referred to as the "active region," or "imaging region" of the rolling GS pixel array 211. Generally, references to the rolling GS pixel array 211 or any other pixel array refer to the active region of the pixel array. Row select lines are selectively activated in groups of at least one, by N-row driver 202 in response to N-row address decoder 203 and the column select lines are selectively activated by column driver 204 in response to column address decoder 205. A given row select line may be connected to row select transistors in each of the pixels of a given row, and may be used to couple the charge accumulated at a floating diffusion node of a given pixel to a column select line. Thus, a row and column address is provided for each pixel.

Image capture and readout using imager 216 is controlled by rolling GS timing and control circuit 217, which controls decoders 203, 205 for selecting the appropriate row and column lines for pixel readout, and row and column driver circuitry 202, 204, which apply driving voltages to the drive transistors of the selected row and column lines. The rolling GS pixel array 211 may be configured to provide charge stored by pixels in N rows in parallel, where N is at least one, and at most the total number of rows in the rolling GS pixel array 211. In this case, an image frame is created by successive operations of simultaneously resetting groups of N rows and successive operations of simultaneously reading out groups of N rows until the entirety of pixels in a desired active imaging region of array 211 has been read out.

N may also be equal to the number of rows in the array 211, in which case an image frame is created after the N rows have been reset and read out in parallel, consistent with the behavior commonly referred to as a "electronic global shutter." When imager 216 is configured to operate as either a true global shutter or as a rolling GS, pixel charge data associated with the N rows that were reset and integrated for a period of time may be routed to optional binning switch 218. Binning switch 218 may be formed in the same plane and substrate as rolling GS pixel array 211, in the same region as the pixels in array 211, in a second layer below the plane of image sensitive pixels, or in any other suitable location.

Binning switch 218 may be configurable to adjust the desired level of binning, or in other words, the number of stored pixel charges associated with respective pixels in array 211 to combine. Binning switch 218 may be configured to add, or "bin," stored pixel charges from pixels in a given block of N rows that are read out in parallel. If desired, binning switch 218 may be configured to bin only pixel charges of pixels associated with the same color channel. Binning switch 218 may be configured to bin pixel charges of pixels associated with different color channels. Binning switch 218 may be configured to bin a configurable plurality of stored pixel charges associated with adjacent pixels of the same or different color channels. Configuration data controlling the frequency of binning and/or the desired level of binning may be provided to binning switch 218 either via one-time-programmable memory (OTPM), through control signals from rolling GS timing and control circuitry 217, or through user input to the electronic device 10. Configuration data for binning switch 218 may additionally or alternatively be derived from desired output image or video capture parameters such as desired resolution, desired frame rate, desired dynamic range, or desired exposure levels.

If binning is desired and performed, binned pixel charges may shifted, transferred, or routed in any suitable way from binning switch 218 either directly to pixel output stage selection 206, or to column driver 204. If binned pixel charges are routed from binning switch 218 to column driver 204, column driver 204 may be configured to then route binned pixel charges to output stage selection 206.

Binning switch 218 may also be bypassed and the pixel charge data associated with the N rows that were reset and integrated for a period of time may be routed to column driver 204. This routing may be achieved by configuring binning 218 to not perform binning on the pixel charges, or by hard wired routing connections. Column driver 204 may receive binned pixel charges from binning switch 218 or it may receive pixel charges directly from N rows of image sensor 211 read out in parallel. Column driver 204 may be configured to receive, select, and route pixel charges from the entirety of rolling GS pixel array 211 in parallel. Column driver 204 may also be configured to receive, select, and route pixel charges from arbitrarily sized two-dimensional blocks from rolling GS pixel array 211 read out in parallel.

Pixel output stage selection circuitry 206 may receive a plurality of stored pixel charges from column driver 204 or binning switch 218. The plurality of stored pixel charges, which are sometimes referred to as "analog pixel values," received by pixel output stage selection circuitry 206, sometimes referred to as simply "stage selection circuitry 206," may correspond to pixel charges associated with individual pixels from the N rows reset and read out in parallel, they may correspond to binned pixel charges, or they may comprise both types of pixel charges. The plurality of pixel charges or analog pixel values received by the pixel output stage selection circuitry 206 may be referred to herein as "L". Pixel output stage selection 206 may be formed on the same plane and substrate as the rolling GS pixel array 211, or it may be formed in a layer below the pixel array 211.

Stage selection circuitry 206 may comprise one-time-programmable-memory (OTPM), any type of read only memory, DRAM, SRAM, memory elements using floating gate transistors and associated addressing circuitry, latch registers, pipelined registers, fuse-blow programmable memory elements, or any other suitable memory storage elements that are either configurable once or dynamically configurable. Stage selection circuitry 206 may be connected to pixel output stage bank 219, which contains a plurality of output stages such as the output stage formed by components 207-1, 208-1, and 209-1. Stage selection circuitry 206 may generally be a programmable interconnect circuit that routes stored pixel charges from either column driver 204 or binning switch 218 to functional output stages in the output stage bank 219. Output stages in output stage bank 219 may be susceptible to manufacturing errors, defects, or yield loss. As a consequence, one or more of the output stages in the output stage bank 219 may be rendered non-functional by a manufacturing error, defect, or yield loss to any one of the components in a given output stage.

Output stage bank 219 may therefore be formed with redundant output stages that compensate for the expected yield loss in output stage components. Stage selection circuitry 206 may be connected to each plurality of output stages, and may be configured to route a plurality incoming pixel charges to a plurality of functional output stages in parallel. Stage selection circuitry 206 may additionally comprise multiplexer components, decoders, encoders, field programmable gate array (FPGA) circuits, or any other suitable circuitry to enable or enhance its programmable interconnect functionality. Determination of whether a given output stage is functional may be determined during a production wafer test process. The stage selection 206 routings may be programmed using OTPM once the functional subset of output stages in output stage bank 219 has been determined. Alternatively, the image sensor may be configured to perform a self-test of the functionality of given output stages by outputting test data onto a given output stage and comparing the output of the output stages with the expected output for the test data. An image sensor configured to self-diagnose a non-functional output stage may be provided routing information on programmable memory such as DRAM or SRAM.

Output stage bank 219 may share some or all the features of pixel output stages 19 of FIG. 1. For example Output stage bank 219 may be formed on a layer below the plane of the rolling GS pixel array 211. Output stage bank 219 formed on a layer below the plane of the rolling GS pixel array 211 may be positioned such that the routing required to transfer stored charge from the rolling GS pixel array 211 is minimized. As an example, output stage bank 219 may be formed in a configuration such that an output stage is formed directly underneath every pixel on a different plane of either a shared or separate semiconductor substrate as the one which supports the rolling GS pixel array 211. Output stage bank 219 may have output stages corresponding in number to the number of pixels the image sensor 16 is configured to read out in parallel.

Output stage bank 219 may be formed such that at least one dedicated output stage for each pixel in rolling GS pixel array 211 is provided. Output stage bank 219 may include redundant output stages that can be provided signals through routing connections corresponding to charges stored in pixels of rolling GS pixel array 211. In general, the number of redundant output stages provided may be any multiple of the minimum number of output stages in addition to those required to read out pixel values from a given plurality of rows in parallel. As an example, if N is equal to the total number of rows in the active region of rolling GS pixel array 211, and M corresponds to the number of columns in each row in the rolling GS pixel array 211, N*M output stages may be provided in output stage bank 219, or 1.5*N*M, 3*N*M, 10*N*M, 100*N*M or any suitable amount of output stages may be provided and formed in output stage bank 219. The total number of output stages in output stage bank 219 may be referred to as "K." The number of redundant output stages provided in output stage bank 219 may be determined at least in part by the desired level of binning that is expected to be implemented in the imager 216, the number of signals L received by the pixel output stage selection circuitry 206, the minimum acceptable resolution for an imager 216, average percent yields for the types of components contained in any given output stage of the output stage bank, power constraints, available silicon area or silicon real estate, any other similar reason, or any combination of reasons. Similar reasons may also at least partly determine the types of components used in a subset of output stages in output stage bank 219. For example, if a high degree or frequency of binning is desired, a subset of output stages in output stage bank 219 may be formed with components that are configured to convert larger analog pixel values to digital pixel values than another subset of output stages in bank 219 that are configured to convert analog pixel values of a lower magnitude.

Output stage bank 219 need not be formed exclusively on the plane of rolling GS pixel array 211, or exclusively on a layer below the rolling GS pixel array 211. Output stage bank 219 may be formed both on the plane and chip containing the array 211, and on a layer below the plane of the array 211. As an example, a first subset of output stage bank 219 may be formed on a layer below the plane of the array 211, and may be referred to as the primary output stage bank. To compensate for possible manufacturing defects that reduce the percentage yield on functional output stages in the primary output stage bank, a second subset of output stage bank 219 may be formed on the plane and chip containing array 211, and may be referred to as the secondary or redundant output stage bank. Stage selection circuitry 206 may be configured to route pixel charges to a plurality of output stages in either the primary or secondary output stage banks, or both, in parallel.

Generally, the output stages in output stage bank 219 may be similar in configuration and function to output stages on imagers controlled using an ERS algorithm. Frame rate and data throughput advantages of using a rolling GS pixel array 211 with parallelized readout of N rows may be indicated by the ratio of frame rate in an imager using a rolling GS pixel array 211 and parallelized N row readout to frame rate in an imager using a traditional pixel array with an ERS readout algorithm, given a constant pixel exposure time and output stage (or, readout) delay. Because a first imager using a rolling GS pixel array 211 may reset and readout N imaging rows in same the time, while a second imager using a traditional pixel array with an ERS readout algorithm may reset and readout a single imaging row, the ratio of the frame rate of the first imager to the frame rate of the second imager is N to 1.

Another metric known as the sensor quantum efficiency, which may be defined as the number of photons captured and read out per unit time (of 1 second, as an example) may be related to the aforementioned frame rate ratio. Assuming scene, operating condition, exposure period, and output stage delay constancy, the ratio of the sensor quantum efficiencies of the rolling GS pixel array reading out N rows in parallel to the traditional pixel array with an ERS readout algorithm may also be N to 1.

Consider an example illustrating the benefits of the overcompensated designing of redundant output stage banks in which a rolling GS pixel array 211 with an active region of 10 rows and 10 columns is provided. Assuming that N is 5, consider the case where redundant output stages are not provided, and merely 50 output stages are provided. In the event that one of the 50 output stages is non-functional, N may need to be reduced to compensate for the reduced amount of data that can be read out in parallel. When N is 5, the ratio of frame rates achievable by similarly sized rolling GS pixel arrays to ERS pixel arrays may be 5 to 1. However, if N is reduced to 4, the aforementioned frame rate ratio may drop to 4 to 1, as an example.

If routing between the binning switch 218 or column driver 204 and the output stages in the output stage bank 219 is not configurable, the usable resolution of the rolling GS pixel array 211 may be reduced. However, one may form 50 redundant output stages, as an example, and provide configurable routing between binning switch 218 and/or column driver 204, such as through output stage selection circuitry 206. In this case, even if half of the original 50 output stages are non-functional, and half of the 50 redundant output stages are non-functional, both the resolution and the high value of N=5 can be maintained by routing the 50 pixel charges to the functional half of the original 50 output stages, and the functional half of the 50 redundant output stages. In general, the values of N, and the number of primary, secondary, or redundant output stages may be any number and are not limited by the values provided in the above example.

A representative output stage in the output stage bank 219 may be illustrated by sample and hold circuitry 207-1, amplifier 208-1, and analog to digital converter (ADC) 209-1. Image processor 213 may be considered a part of the output stage, and an individual image processor 213 may be provided for each output stage if desired. In the illustration of FIG. 2, a common image processor 213 receives the outputs of ADCs 209, but this is merely illustrative and not intended as a limitation on the present embodiment of the invention.

Sample and hold circuitry 207 may receive pixel charges and output a pair of pixel signals. The pixel signals, which typically include a pixel reset signal Vrst and a pixel image signal Vsig for each pixel are sampled by sample and hold circuitry 207 associated with the column driver 204 or binning switch 218. The pixel signals may be obtained using a correlated double sampling (CDS) algorithm which may be implemented at least in part through rolling GS timing and control circuitry 217. A differential signal Vrst−Vsig is produced for each pixel, which is amplified by amplifier 208 and digitized by analog-to-digital converter 209. The analog to digital converter 209 converts the analog pixel signals to digital signals, which are fed to image processor 213 and which may be used to form a digital image or a portion of a digital image. Image processor 213 may share some or all of the features of image processing and data formatting circuitry 13 of FIG. 1.

Image processor 213 may be used to perform image processing functions such as demosaicing, edge seam correction, automatic focusing functions, depth sensing, data formatting, adjusting white balance and exposure, implementing video image stabilization, face detection, etc. For example, upon receiving image data produced by a parallelized readout of a plurality of rows, such as the outputs of ADCs 209, image processor 213 may process data gathered by the pixels in the group of rows read out in parallel as if the pixels in the group were captured using a global shutter. Processing data as if the pixels were captured using a global shutter may involve modified or reduced correction, in comparison with corrections associated with ERS pixel data. Image processor 213 may additionally demosaic the data from a group or block of rows read out in parallel using only data contained in the set or block formed by the rows read out in parallel. Circuitry 13 may additionally perform edge or seam correction on the edges of and between blocks of image data that are read out using a parallelized readout method.

Pixel output stages in bank 219 may be identical, or non-identical. For example, some output stages may have ADCs 209 with lower resolution conversions, or with higher acceptable input voltage swing ranges than other output stages. Similarly, sample and hold circuitry 207 and amplifier circuitry 208 may not be identical across output stages. Certain output stages may be particularly well suited to readout binned values, for example, while certain output stages may be particularly well suited to readout values associated with low-light image capture operations.

To illustrate how the pixel output stage selection 206 used in combination with the binning switch 218 can enable significant power savings during the operation of the imager 216, consider as an example a rolling GS pixel array 211 with an active region of 100 rows and 100 columns. As an example, consider that N is set to 10, indicating that rolling GS timing and control circuitry 217 configures the rolling GS pixel array 211 to reset and read out 10 rows in parallel (simultaneously). During the parallelized readout operation of the first 10 rows of rolling GS pixel array 211 following the parallelized reset operation of the first 10 rows of array 211, either the column driver 204 or the binning switch 218 may receive stored pixel charge values associated with the 10*100, or 1,000 pixels in the given block of N rows. Imager 216 may be configured to enable binning of first and second sets of 5 pixels in every column associated with pixels in even and odd rows respectively of every column. Instead of utilizing 1,000 output stages to convert the pixel charges associated with the pixels in the given block of N rows, the binning performed by binning switch 218 enables the pixel charges to be processed by merely 200 output stages, two-tenths of the number of output stages required for the parallelized readout without binning. Output stage selection circuitry 206 may route the binned pixel charges to functional output stages in accordance with configuration data supplied during production wafer testing, or by self-diagnosed status information as described above. Power savings may therefore be realized when binning switch 218 is used in combination with output stage selection circuitry 206.

Figure 3:
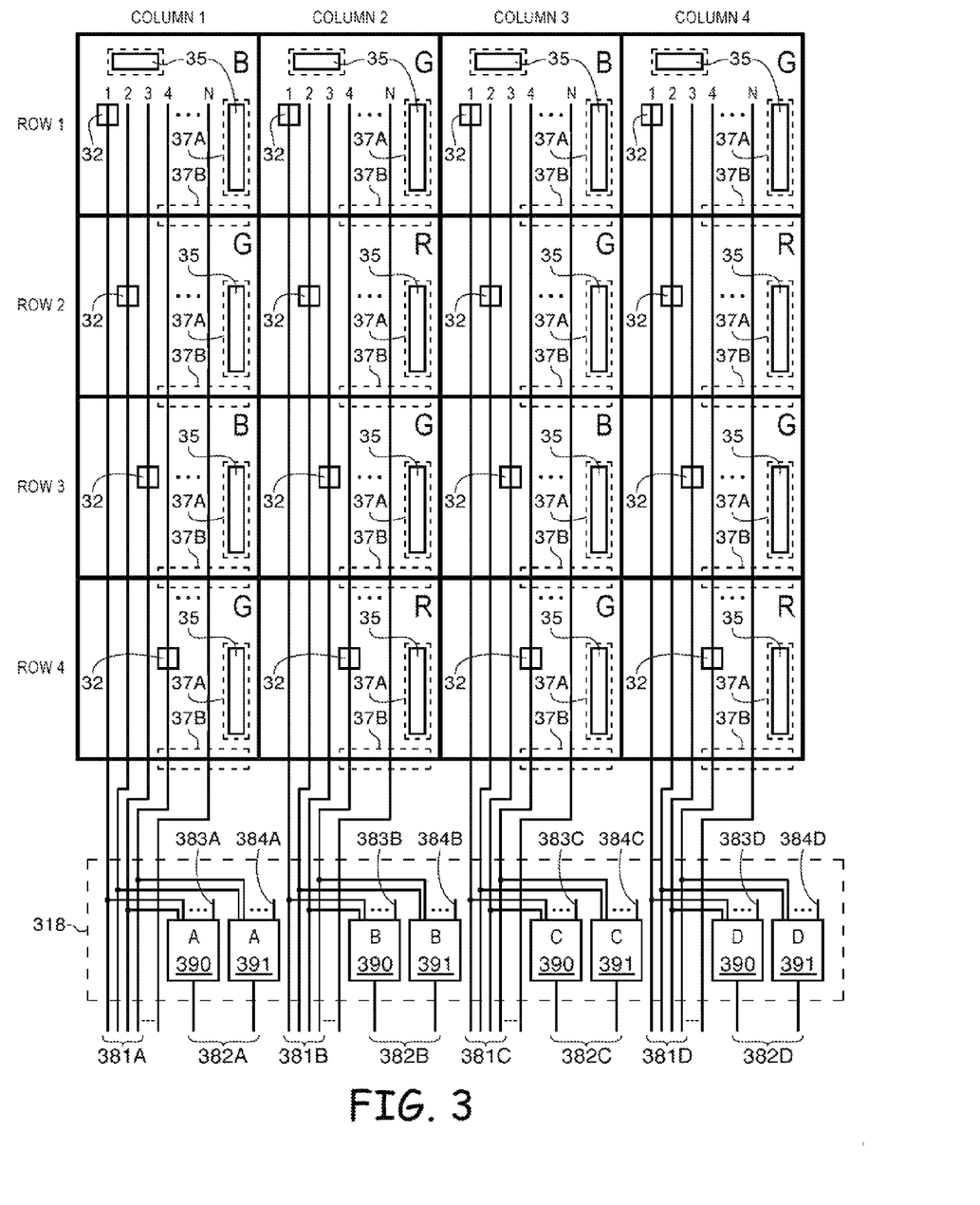
FIG. 3 is an illustrative example of an image pixel array on an image sensor having parallelized reset and readout capabilities in accordance with an embodiment of the present invention.

FIG. 3 is an illustrative diagram showing a rolling GS pixel array 311 coupled to a binning switch 318. Rolling GS pixel array 311 may be referred to simply as the array 311 in the description of the figure. FIG. 3 is not to scale, and the spatial disposition of elements in FIG. 3 is not intended to limit the scope of the present embodiment of the invention. Array 311 may share some or all of the features of rolling GS pixel array 211 of FIG. 2 and/or array 11 of FIG. 1. Binning switch 318 may share some or all of the features of binning switch 218 of FIG. 2. Array 311 and binning switch 318 as portrayed in FIG. 3 are illustrative examples of components in a rolling GS imager. In another suitable arrangement, array 311 may be configured to be used as a true global shutter. Rows 1-4 and columns 1-4 of array 311 are shown as an illustrative subset of an array 311 that may contain hundreds or thousands of rows and columns. Binning switch 318 is shown as an illustrative subset of a configurable binning switch, and may generally contain any desired number of binning switches. Binning switch 318 is shown to be on the same plane as the array 311, but may be formed on a layer below the plane of the array 311, and may also be formed on a layer below the plane of the array 311 and positioned underneath the pixels of the array 311.

Rows 1-3 of array 311 may, for example, include pixels associated with color channels dispersed in a Bayer color filter array pattern. Generally, a pixel at a row A and column B may be referred to herein as "the (A, B) pixel," or "A-B pixel." Array 311 may be formed with color channels dispersed in accordance with any color filter array pattern, and may include channels for light outside the visible band. Pixels at (1, 1), (1, 3), (3, 1), and (3, 3) may be associated with a blue color channel, for example. Pixels at (1, 2), (1, 3), (2, 1), and (2, 3) may be associated with red color channels. The remaining pixels shown in the subsection of array 311 of FIG. 3 may be associated with green color channels.

Rolling GS pixel array 311 may be designed such that there are an arbitrary number of column readout lines per pixel pitch. The pixel pitch may generally refer to the width of a pixel, or the distance between pixels of the same color in the present example of pixels configured in a Bayer pattern. FIG. 3 illustrates an array provided with N column readout lines per pixel pitch. The N column readout lines provided for each column may be routed parallel to the plane of the array 311, and may be routed on a metal layer formed beneath the image pixels. Some or all of the column readout lines for a given column may be formed on different metal layers than the other column readout lines for the given column. Some or all of the N column readout lines provided for each column may alternatively be routed perpendicular to the plane of the array 311, and may be connected to layers disposed below the array 311, and connect to circuitry in layers disposed below the array 311. Column readout lines may be routed in any suitable path comprising paths perpendicular and parallel to the plane of array 311.

Taking column 1 as an example, N column readout lines are shown. It is further seen that a via 32, sometimes referred to as a through device via (TDV) 32, is connected to the column readout line 1. Column readout line 1 in the group of un-binned column readout lines 381A may be coupled to a source follower in the 1-1 pixel through via 32. Column readout line 1 in the group 381A may be connected to any node on the 1-1 pixel associated with a readout node by via 32, such as a node of a row-select transistor associated with the 1-1 pixel. Column readout line 2 in the group 381A may be connected to a node associated with the readout node of the 2-1 pixel through via 32. Similarly, it can be appreciated that the readout node of given node may be coupled to a column readout line through a via 32. Two notable cases present themselves: the first where N is less than the number of rows in the array 311, the second where N is equal to the number of rows in the array 311.

Taking the first case where N is less than the number of rows in the array 311, it can be appreciated that array 311 may be operated as a rolling GS array. As an example, array 311 may comprise 60 rows and 60 columns in its active imaging region, and N may be taken to be 6. Notably, both the maximum frame rate ratio and sensor quantum efficiency ratio, between the rolling GS array 311 in this example to a traditional pixel array operated using an ERS algorithm are 6 to 1. Because N is 6, only 6 column readout lines are necessary to reset and readout 6 rows in parallel. However, additional column readout lines may be provided to allow the user or system to vary the value of N during rolling GS operations. Pixel 5-1 (not pictured) may be connected to column select line 5 in the group 381A by a via 32. Pixel 6-1 (not pictured) may be connected to column select line 6 in group 381A by a via 32. Pixels 7-1 to 12-1 (not pictured) may be connected to column select lines 1-6 in group 381A using vias, in the same manner that pixels 1-1 to 6-1 are, respectively.

The pixels in array 311 are most generally CMOS pixels, comprising interconnected transistors that are powered by positive supply and ground voltages, and may comprise a plurality of charge storage nodes that are coupled to transistors and photosensitive elements in the pixels.

During image capture operations, rows 1-6 may first be reset in parallel. It may alternatively be said that when rows 1-6 are reset in parallel, they are reset simultaneously. Resetting rows 1-6 may comprise first asserting a reset signal to reset transistors in each respective transistor of the pixels in rows 1-6. After the reset signal has been de-asserted, the pixels in rows 1-6 can be said to be undergoing integration or exposure. Charge may accumulate on photodiodes or equivalent photosensitive elements in the pixels in array 311. After an integration period has elapsed, a transfer transistor in each respective pixel of rows 1-6 may be activated in response to the assertion of a transfer signal, to transfer the charge accumulated by the photosensitive elements in the pixels of array 311 to a node in the pixel known as a floating diffusion node. The transfer signal may be applied by row decoder 202 or by column driver 204. The transfer signal may be applied in response to control signals from rolling GS timing and control circuitry 217. The pixels in rows 1-6 rows may optionally receive a brief reset signal applied to their respective reset transistor, before the transfer gate signal is asserted. This optional reset signal may be used in certain correlated double sampling (CDS) algorithms. After the charge has been transferred, the pixels may optionally be sampled for values that may be used for a CDS algorithm. These measurements may also or alternatively take place just as or before the reset signal is first asserted or first de-asserted.

After the charge has been transferred to the floating diffusion nodes of the respective pixels in rows 1-6, a row select transistor in each pixel of rows 1-6 that is coupled to the floating diffusion node may be activated by a row select signal, thereby transferring a charge onto the column select lines. This charge may represent, or be directly or deterministically related to the charge stored on the floating diffusion node at the end of the integration period. The row select transistors may be coupled to the floating diffusion node via a source follower amplifying transistor, wherein the gate of the source follower amplifying transistor is coupled to the floating diffusion node. Upon assertion of row control signals to the row select transistors, the charge or an analog pixel value associated with the charge may be transferred to column lines in groups 381 corresponding to the columns in rows 1-6.

If the binning switch 318 is omitted, then column select lines 381 may be routed directly to circuitry such as the column driver 204 of FIG. 2. Column driver 204 may route the column lines with charges or analog pixel values associated with pixels in rows 1-6 to pixel output stage selection circuitry 206, where the charges or analog pixel values will be read out in parallel by a subset of output stages in output stage bank 219. In general, the term "analog pixel values" may be used to describe the charges or signals produced on the column lines during readout operations.

Binning switch 318 may alternatively be included and configured to perform binning on the charge transferred to column lines in groups 381 by means of binning circuitry 390 and 391. Taking the example of column 1 in FIG. 3, it can be seen that binning circuit 390A receives column select lines 1 and 3, corresponding to column select lines with vias connected to pixels 1-1 and 3-1. Pixels 1-1 and 3-1 correspond to pixels of the same color channel, but in general column lines associated with any pair of pixels may be connected to a given binning switch 390A. Binning circuit 390A may also receive additional signals 383A which may include column select lines from other columns to accomplish two-dimensional binning. Additional signals 383A may also include configuration data that enables binning, disables binning, specifies the block size and type to be binned (i.e. only vertical binning, vertical binning of two rows, two-dimensional binning, two-dimensional binning of 2 by 2 blocks, etc.). In the present example, binning circuit 390A may be configured to additionally receive the column select line 5 associated with pixel 5-1, which is included in the range of rows 1-6 that are reset and read out in parallel.

Binning circuit 391A may be functionally equivalent to binning circuit 390A. FIG. 3 shows binning circuit 390A receiving column select lines 2 and 4 associated with pixels 2-1 and 4-1, but in the present example where rows 1-6 are reset and read out in parallel, it may additionally receive column line 6 associated with pixel 6-1. Pixels 2-1, 4-1, and 6-1 correspond to pixels of the same color channel, but in general column lines associated with any pair of pixels may be connected to a given binning circuit 391A. Binning circuit 391A may also receive additional signals 384A which may include column select lines from other columns to accomplish two-dimensional binning Additional signals 384A may also include configuration data that enables binning, disables binning, specifies the block size and type to be binned (i.e. only vertical binning, vertical binning of two rows, two-dimensional binning, two-dimensional binning of 2 by 2 blocks, etc.).

After binning has been performed, binned charges 382 may be output either directly to pixel output stage selection circuitry 206 or to column driver 204 which then routes the charges to pixel output stage selection 206. Binned signals 382 may generally be N bits, and may have different combinations of binned charges than those shown in FIG. 3. As mentioned above, binned signals 382 are not limited to vertically binned signals, but may comprise horizontally binned, or two-dimensionally binned charges. Binned signals 382 may also comprise un-binned charges generally identical to corresponding signals in group 381, if additional signals 383 and 384 contain configuration data to disable binning for a given image frame. Once the charges on lines 382 are routed to pixel output stage selection 206, the charges will be read out in parallel by a subset of output stages in output stage bank 219, as described in connection with a representative output stage in the description of output stage bank 219 above.

Whether or not binning is performed by binning switch 318, following the parallel reset of rows 1-6 in the example, subsequent blocks of N (or in the example, 6) rows will be reset and subsequently read out. The exact timing of reset and readout of N-row blocks may be determined by a trigger mode which may be loaded in control circuitry such as rolling GS timing and control 217. A trigger mode may generally govern the response of an imager 216 to an input known as a trigger signal. A first trigger mode may configure an imager such as 216 to begin a readout operation in response to a trigger signal, whereas a second trigger mode may configure an imager to begin an N-block reset operation in response to a trigger signal.

The second case in which N is equal to the number of rows in the active region of array 311 is largely similar to the example above wherein N is taken to be 6. To create an image frame, however, successive parallelized reset and readout operations of N-row blocks are not necessary, as N is equal to the number of rows in the image frame.

Transistors in the pixels of array 311 such as the reset transistor, the transfer transistor, the source follower transistor, and the row transistor may be located in regions 35 in each pixel. A pixel's floating diffusion node may also be located in a region 35. For the sake of simplicity, a plurality of regions 35 are shown only for row 1 of array 311, but generally each pixel may have a plurality of regions 35 corresponding to the spatial positions of the aforementioned transistors and nodes. If desired, region 35 may be shielded by isolation structures in regions 37 to attenuate or eliminate coupling between signals and nodes in pixels in adjacent rows or columns, and any electrical asymmetry that may result when multiple rows are reset and read out at once.

Regions 37A may correspond to regions with shielding or isolation structures that may be supply voltage shields or ground voltage shields that are powered by a constant voltage source and prevent electrical signals from coupling to the circuitry or charged nodes within regions 35. Such decoupling capacitances may serve to filter high frequency noise between floating diffusion nodes in adjacent pixels within a row or in pixels in adjacent rows. Regions 37A may also shield the relevant nodes or transistors from noise or coupling by comprising polysilicon structures, or other insulating materials to shield selected nodes or transistors from experiencing coupling from adjacent pictures in the same or adjacent rows. Generally, regions 37A may be thought to concentrically isolate the nodes or signal paths that may couple together between two row blocks, in so far as the regions 37A surround nodes or signal paths that may couple together.

Regions 37B correspond to isolation or shielding structures that are not formed specifically around sensitive nodes, lines, or transistors but serve the same function as regions 37A, namely to shield a given pixel from signals or nodes in neighboring pixels that may couple with circuitry in the given pixel. Shielding structures 37 may decouple sensitive nodes, lines, or transistors of a given pixel from signal pathways or nodes associated with neighboring pixels that are on the same level or layer in a semiconductor device as the sensitive nodes, lines, or transistors of the given pixel, or on a different layer in a semiconductor device from the sensitive nodes, lines, or transistors of the given pixel.

Advantages of using shielding structures 37 may be apparent when the normal operation of a rolling GS pixel array such as 311 is examined. For example, when asserting the transfer signal on the gate of the transfer transistor associated with a pixel, a substantial coupling to the floating diffusion nodes may occur, as accumulated charge is moving from the photosensitive elements to the floating diffusion node along a signal path. This signal path may be routed close to isolation structures 37 to both shield the signal path from coupling, and to shield adjacent nodes from the coupling. As another example, if multiple reset gates provided an asserted reset signal, there may be coupling between adjacent pixels as a potentially large movement of charge may be taking place across a signal path. However, by forming isolation structures such as polysilicon rings that surround the reset transistors and/or signal paths, or by forming supply voltage or ground voltage grids near the reset transistors and/or signal paths, coupling or asymmetric influence between nodes, signal paths, or transistors in adjacent pixels can be avoided.

Figure 4:
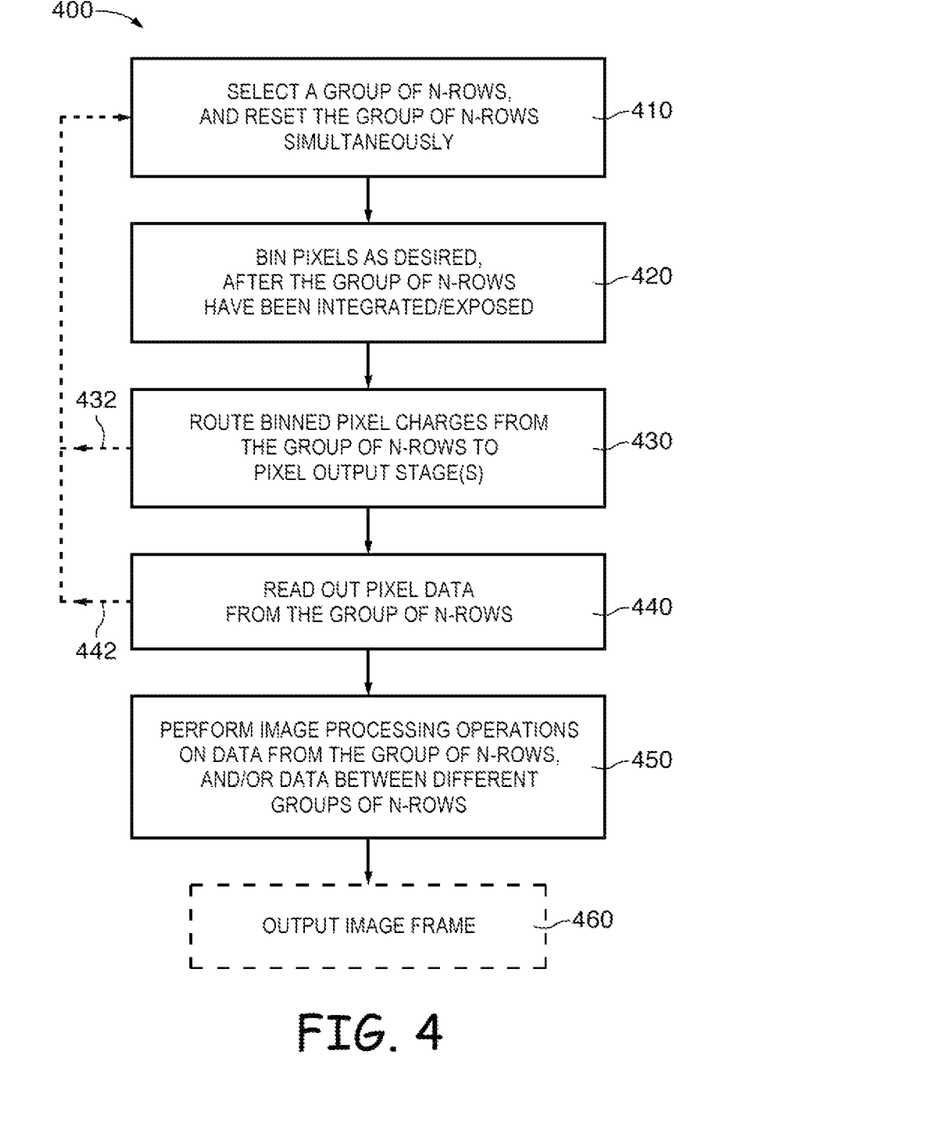
FIG. 4 is a flowchart of illustrative steps for operating an image pixel array of the type shown in FIG. 3 to reset and readout a plurality of rows simultaneously in accordance with an embodiment of the present invention.

FIG. 4 is an illustrative flow chart which details the method 400 for operating an array such as array 311 of FIG. 3, array 211 of FIG. 2, or array 11 of FIG. 1 in either a rolling GS configuration or in a global shutter configuration. At step 410, a group of N rows may be selected and reset simultaneously. Generally, the group of N rows may be any N rows in a rolling GS pixel array with no two rows having connections to the same column select line. In normal operation, the group of N rows may be adjacent rows. Resetting the group of N rows simultaneously may comprise applying a reset control signal to reset gates in the pixels associated with the given group of N rows.

At step 420, the group of N rows may be binned as desired (e.g., after the group of N rows have been integrated or exposed for the desired period). In another suitable arrangement, binning may be omitted.

At step 430, pixel values (which may have been binned in step 420) may be routed to the pixel output stages. Pixel values may be routed by means of a coupling from column select lines via binning switches such as 218 or 318 in FIGS. 2 and 3 respectively to pixel output stage selection circuitry such as 206 of FIG. 2. Alternatively or additionally, pixel charges may be routed via a connection from the column driver to pixel output stage selection circuitry 206. Routing of charges from pixel output stage selection circuitry 206 to respective output stages has been described in connection with FIG. 2 above. Depending on the trigger mode that imager 216 is configured to act in accordance with, transition 432 indicates an optional transition to step 410 which does not take the place of the transition to step 440 and subsequently step 450 for the process initiated with a given group of N rows. A transition 432 to step 410 may occur in response to a trigger input signal, or the configuration of an imager 216. If transition 432 to step 410 occurs, step 410 will select the next block of N rows in a rolling GS pixel array, and continue to step 450. In the case of an array such as 311 where N is selected to be the number of rows in the pixel array, and the array 311 is configured to operate using a true global shutter, if transition 432 is used to initiate a process starting with step 410, the same group of N rows (namely, all the rows) will be selected. However, even as is the case when N is less than the number of active rows (i.e. with the rolling GS pixel array) the array 311 operating using a true global shutter may continue to step 440.

At step 440, pixel data from the group of N-rows may be read out. Readout of pixel data as digital values is described, for example, in connection with a representative output stage in output stage bank 219 of FIG. 2. Depending on the trigger mode that imager 216 is configured to act in accordance with, transition 442 indicates an optional transition to step 410 which does not take the place of the transition to step 450 for the process initiated with a given group of N rows. A transition 442 to step 410 may occur in response to a trigger input signal, or the configuration of an imager 216. If transition 432 to step 410 occurs, step 410 will usually select the next block of N rows in a rolling GS pixel array, and continue to step 450. In the case of an array such as 311 where N is selected to be the number of rows in the pixel array, and the array 311 is configured to operate using a true global shutter, if transition 442 is used to initiate a process starting with step 410, the same group of N rows (namely, all the rows) will be selected. However, even as is the case when N is less than the number of active rows (i.e. with the rolling GS pixel array) the array 311 operating using a true global shutter will continue to step 450.

At step 450, image processing operations may be performed on the image data from the group of N-rows and/or data between different groups of rows. Generally, these image processing operations may be the same or similar to the operations described in connection with image processing and data formatting circuitry 13 of FIG. 1 and/or image processor 213 of FIG. 2. Image processing operations on data from the group of N rows may describe image processing operations performed on pixels with a shared reset and readout time. Pixels captured in this way may be treated as if they were captured by a global shutter sensor. In this case, certain image processing operations such as color correction, exposure adjustment, motion correction may be altered versions of similar processes in imagers configured to capture images with ERS algorithms. Demosaicing operations, for example, may be altered in that the demosaic operations on images captured using a rolling GS array and method may be restricted to interpolate data from pixels from within the same group of N rows. In other words, interpolation or demosaicing may only occur between pixels with were reset and readout in parallel.

Image processing operations on data between different groups of rows may refer to seam correction performed on the edge rows associated with blocks of N rows that were read out in parallel. Successive blocks of N rows may have been reset at different times, if N was selected to be less than the total number of rows, and may be used to compose a common image frame. To compensate for any discontinuities in an image frame composed from digital pixel values associated with blocks of N rows read out in parallel, wherein the blocks themselves may have been read out at different times, seam correction may be performed on edge rows of blocks of N rows, or on entire blocks of N rows. Seam correction may comprise determining linear correction factors to apply to one or more blocks of adjacent blocks of N rows and applying appropriate offset and/or gain corrections to produce an image without visible seam artifacts.

At step 460, the image frame may be output to external processing circuitry. If N is equal to the number of rows in the active region, this step may occur once for every time step 410 is initiated. If N is less than the number of rows in the active region, this step may occur in the process wherein the group of N rows selected step 410 includes the last row of the active region of the array such as 311. An image frame may be output to storage processing circuitry 18 of FIG. 1, as an example.

Skilled practitioners of the art may appreciate that the present invention enables an array such as rolling GS pixel array 311 to have improved performance in flickering light scenarios over traditional image sensor arrays that are operated with ERS algorithms. Referring to array 311 of FIG. 3, consider as an example a flickering event whose light is incident on pixels 1-1, 1-2, 2-1, and 2-2 of array 311, and whose duration is roughly equivalent to the readout time associated with converting a pixel charge to a digital value through one of the plurality of output stages in output stage bank 219.

As an example, consider first the case when N is 1, and rolling GS pixel array 311 is operated as a traditional image sensor using an ERS algorithm. It can be appreciated that the duration of a flickering event may be roughly equivalent to, or even less than either the integration period, the readout time of a row, or the sum of the two durations. Reset and subsequent integration of the first row may start at the same time of the flickering event, and consequently, the event may end before the second row is reset and readout. Therefore, recordation of the flickering event in a traditional sensor using an ERS algorithm may only include information about the event in two of the three color channels, namely the blue channel associated with pixel 1-1 and the green channel associated with pixel 1-2. If the flickering event reflects or emits red light, the information about the amount of red light in the event, information that would ordinarily be associated with pixels of red color channels in the second row, will not be recorded in the recordation of the event during image capture as the event ends before the second row is reset and integrated. This deficiency of the ERS algorithm with single row reset and readout capabilities may result in both spatial and color inaccuracies in capturing the event.

When array 311 is operated as a rolling GS pixel array with N greater than 1, it is possible to simultaneous reset and read out rows with pixels corresponding to all color channels in the array. Taking the same example of the flickering event, when the first two rows are reset and exposed to the flickering event, information about the flickering event will be captured in all color channels, as pixel 2-2 corresponding to the red channel will be reset and read out with pixels in the first row in parallel. Even if array 311 is configured to operate as a rolling GS pixel array with N as small as 2, when the first two rows of array 311 are simultaneously reset and subsequently read out, the light associated with the flickering event will have been exposed in two rows of the Bayer filter array, which is sufficient to capture color information about the event in all three color channels.

Figure 5:
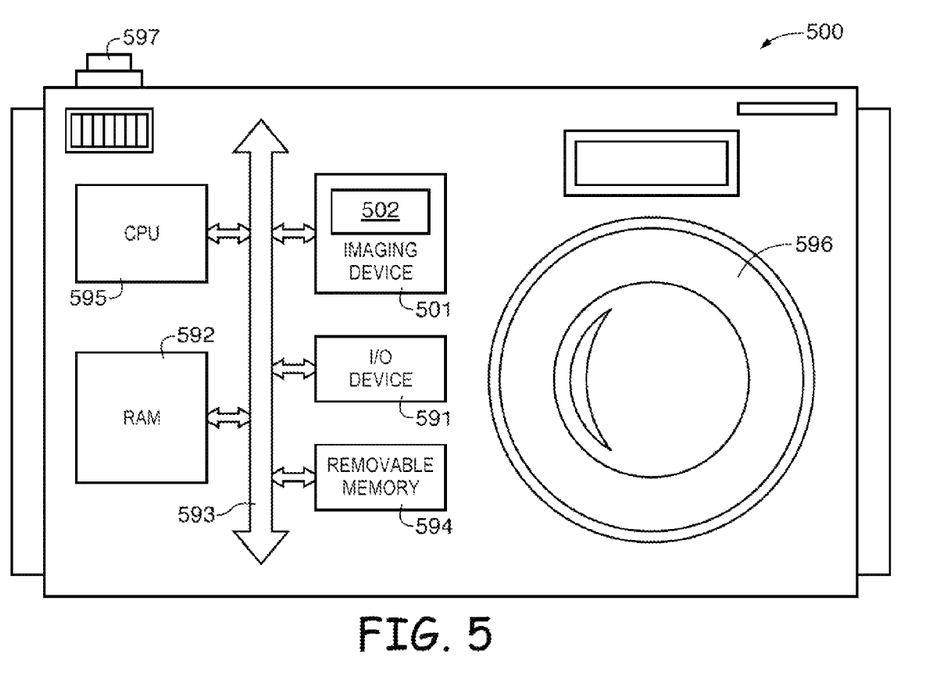
FIG. 5 is a block diagram of a processor system employing the embodiments of FIGS. 1-4 in accordance with an embodiment of the present invention.

FIG. 5 shows in simplified form a typical processor system 500, such as a digital camera, which includes an imaging device such as imaging device 501 (e.g., an imaging device 501 such as imaging sensor 16 of FIG. 1 configurable to reset and read out N rows of pixel charges in parallel). Processor system 500 is exemplary of a system having digital circuits that could include imaging device 501. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 500, which may be a digital still or video camera system, may include a lens such as lens 596 for focusing an image onto a pixel array such as pixel array 502 when shutter release button 397 is pressed. Processor system 500 may include a central processing unit such as central processing unit (CPU) 595. CPU 595 may be a microprocessor that controls camera functions and one or more image flow functions and communicates with one or more input/output (I/O) devices 591 over a bus such as bus 593. Imaging device 501 may also communicate with CPU 595 over bus 593. System 500 may include random access memory (RAM) 592 and removable memory 594. Removable memory 594 may include flash memory that communicates with CPU 595 over bus 593. Imaging device 501 may be combined with CPU 595, with or without memory storage, on a single integrated circuit or on a different chip. Although bus 593 is illustrated as a single bus, it may be one or more buses or bridges or other communication paths used to interconnect the system components.

Various embodiments have been described illustrating image sensor pixel arrays having a plurality of column select lines per pixel pitch. Image sensor pixel arrays configured in this way may be configurable to reset and read out a plurality of N rows in parallel, and may be referred to a rolling global shutter pixel array, when N is less than the number of rows in the active imaging region of the image sensor pixel array. An image frame may be formed by successive readouts of two-dimensional blocks of pixel charges, and may be formed at a rate that is proportional to the size of the two-dimensional blocks of pixels, specifically the number of rows read out at a time, N.

When N is equal to the number of rows in the active imaging region of the image sensor pixel array, the image sensor pixel array may be operated as a true global shutter. In this configuration, wherein all the rows in the active imaging region of the pixel array are reset and read in parallel, the need for image processing to correct for many of the image artifacts and aberrations caused in images formed by ERS algorithms is avoided, and data throughput is improved. Frame rates achievable in both the rolling GS and the true global shutter may be orders of magnitudes greater than frame rates achievable in comparable image sensors that are operated and read out using conventional ERS algorithms and image sensor architecture.

The image sensor pixel arrays described in the present invention may have isolation or shielding structures associated with each imaging pixel in the active region of the image sensor pixel array. Isolation or shielding structures may completely surround signal paths, nodes, transistors, or control lines sensitive to coupling or interference from signal paths, nodes or transistors of neighboring pixels. Isolation or shielding structures may surround at least two edges of elements prone to coupling or interference.

An output stage bank is described, which may improve the sensor yield by compensating for yield loss in output stage components. The operability of a given output stage may be determined during production wafer testing, or self-diagnosed by the image sensor. An image sensor may have configurable or programmable routing circuitry that routes column select lines to functional output stages.

A binning switch circuitry is described, which is configured to combine or bin charges associated with individual pixels. The binning switch may be operable to perform vertical binning, horizontal binning, or a combination of the two. The binning switch circuitry may be configured to route signals to the programmable routing circuitry.

The foregoing is merely illustrative of the principles of this invention and various modifications can be made by those skilled in the art without departing from the scope and spirit of the invention.

What is claimed is:

1. An image sensor comprising:
   an array of image sensor pixels arranged in rows and columns;
   a first column readout line coupled to a first image sensor pixel in a given column of the array;
   a second column readout line coupled to a second image sensor pixel in the given column; and
   a third column readout line coupled to a third image sensor pixel in the given column, wherein the image sensor pixels each comprise respective signal pathways on which respective signals are transmitted, and wherein the image sensor further comprises isolation structures associated with a given image sensor pixel that are configured to decouple the signal pathways of the given image sensor pixel from the respective signals of image sensor pixels adjacent to the given image sensor pixel in the array.

2. The image sensor defined in claim 1, further comprising converter stage circuitry coupled to the array of image sensing pixels that is configured to convert analog pixel values generated by the first, second, and third image sensor pixels to corresponding digital pixel values in parallel.

3. The image sensor defined in claim 2, wherein the converter stage circuitry comprises a plurality of converter stages, wherein the plurality of converter stages comprises a number of redundant converter stages.

4. The image sensor defined in claim 3, further comprising reconfigurable converter stage selection circuitry that couples image sensor pixels in the given column to a subset of the plurality of converter stages.

5. The image sensor defined in claim 4, wherein the reconfigurable output stage selection circuitry comprises one time programmable memory elements.

6. The image sensor defined in claim 5, wherein a given converter stage of the plurality of converter stages is coupled to a given image sensor pixel in the given column based at least in part by data stored by the one-time programmable memory elements.

7. The image sensor defined in claim 1, wherein the given column of the array has a width and the first, second, and third column readout lines are formed within the width of the given column.

8. The image sensor defined in claim 1, wherein the isolation structures surround at least two edges of the given image sensor pixel.

9. The image sensor defined in claim 1, wherein the isolation structures comprise conductive elements on which a constant voltage is asserted.

10. The image sensor defined in claim 1, wherein the isolation structures comprise structures formed from an insulating material.

11. The image sensor defined in claim 1, wherein the signal pathways of the given image sensor pixel are on a first layer in a semiconductor die, wherein the respective signals of image sensor pixels adjacent to the given image sensor pixel are on respective signal pathways on a second layer in a semiconductor die that is different from the first layer.

12. The image sensor defined in claim 1, wherein the first, second, and third column readout lines route analog pixel values from the respective first, second, and third image sensor pixels in the array, wherein the image sensor further comprises a plurality of binning switches that receive the charges from the column readout lines and that are configurable to combine at least two of the analog pixel values from the first, second, and third image sensor pixels to produce a binned pixel value.

13. The image sensor defined in claim 12, wherein the array of image sensor pixels is formed on a first integrated circuit die, and wherein the plurality of binning switches are formed on a second integrated circuit die that is attached to a bottom surface of the first integrated circuit die.

14. A method of operating an image sensor comprising an array of image pixels arranged in rows and columns and interconnect circuitry, the method comprising:
   with the interconnect circuitry, routing analog pixel values generated by at least two image pixels in a given column of the array in parallel to respective first and second converter circuits, wherein each image pixel of the at least two image pixels is coupled to a respective column readout line;
   with the first and second converter circuits, converting the analog pixel values generated by the at least two image pixels in the given column in parallel to corresponding digital pixel values; and
   with charge binning circuitry interposed between the interconnect circuitry and the array of image pixels, combining the analog pixel values to generate a binned pixel value and routing the binned pixel value to the interconnect circuitry, wherein each column readout line is coupled to the interconnect circuitry via a first path that does not include the charge binning circuitry, and wherein each column readout line is coupled to the charge binning circuitry via a second path.

15. The method defined in claim 14, further comprising:
   with image processing circuitry, demosaicking the digital pixel values to generate a demosaicked image.

16. The method of claim 14, wherein the array of image sensing pixels is formed on a first integrated circuit die, and wherein the plurality of converter circuits are formed on a second integrated circuit die that is attached to a bottom surface of the first integrated circuit die.

17. A system, comprising:
   a central processing unit;
   memory;
   a lens;
   input-output circuitry; and
   an imaging device, comprising:
      an array of imaging pixels arranged in rows and columns, wherein the imaging device includes a total number of imaging pixels;
      row control circuitry configured to reset imaging pixels located in a single column and a plurality of the rows of the array in parallel, wherein each imaging pixel generates a corresponding analog pixel value; and
      a plurality of output stages each coupled to output stage selection circuitry, wherein each output stage of the plurality of output stages is configured to convert an analog pixel value to a digital pixel value, wherein the output stage selection circuitry provides analog pixel values to the output stages, wherein there are a total number of output stages in the plurality of output stages, and wherein the total number of output stages is greater than the total number of imaging pixels.

18. The system defined in claim 17, wherein the row control circuitry is configured to reset all of the imaging pixels in the array simultaneously.

19. The system defined in claim 17, wherein the plurality of output stages includes a first output stage and a second output stage, wherein the first output stage has a first analog to digital converter, wherein the second output stage has a second analog to digital converter, wherein the first analog to digital converter is configured to convert analog pixel values of a first magnitude, wherein the second analog to digital converter is configured to convert analog pixel values of a second magnitude, and wherein the first magnitude is greater than the second magnitude.

20. The system defined in claim 17, wherein the plurality of output stages includes a first output stage and a second output stage, wherein the first output stage has a first analog to digital converter, wherein the second output stage has a second analog to digital converter, wherein the first analog to digital converter has a first acceptable input voltage swing, and wherein the second analog to digital converter has a second acceptable input voltage swing that is different than the first acceptable input voltage swing.

* * * * *